Jan. 2, 1934.   W. A. BLUME   1,941,656
FRICTION BRAKE
Filed June 28, 1930
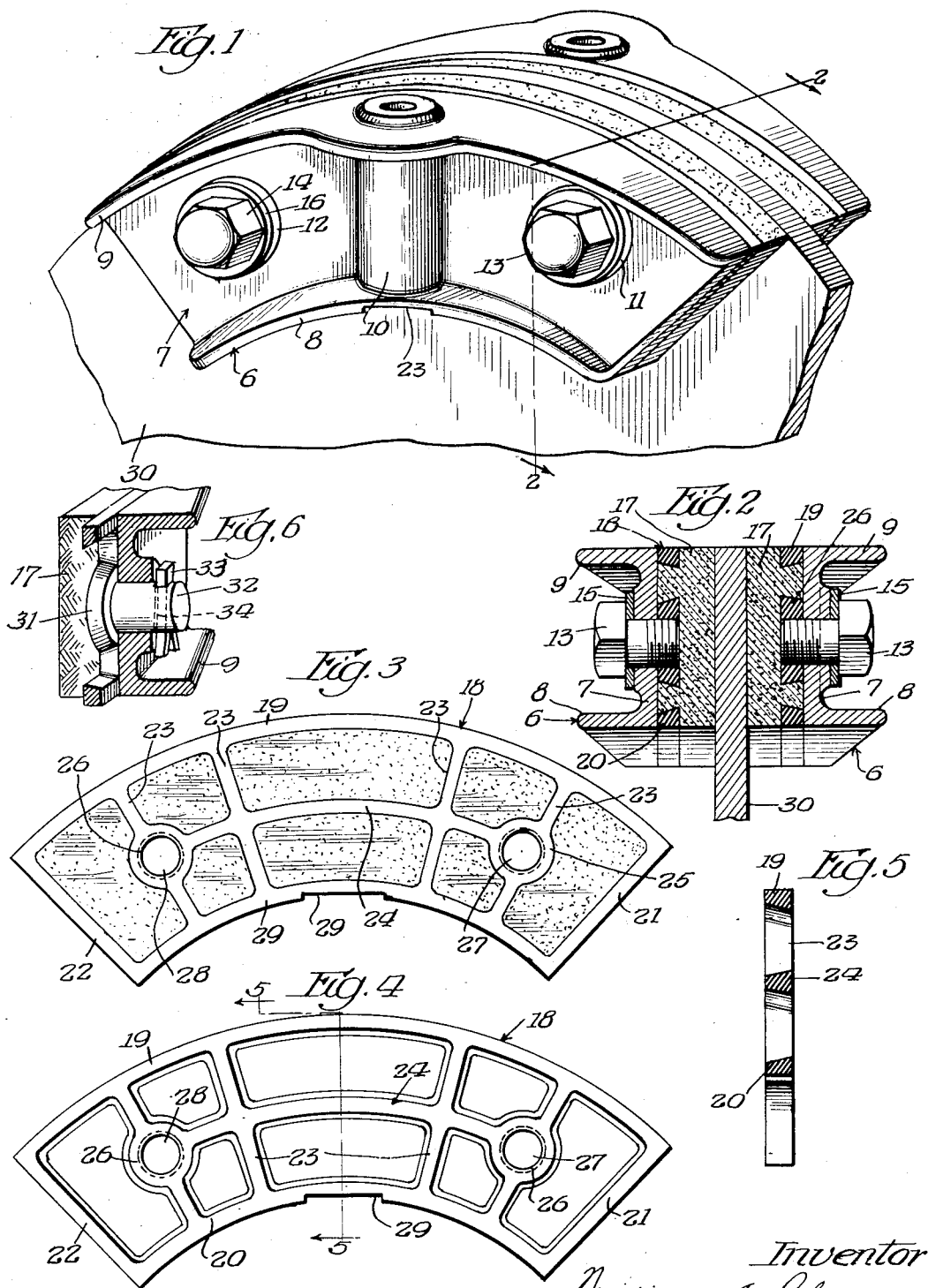
Inventor
William A. Blume
By Wm. O. Belt Atty.

Patented Jan. 2, 1934

1,941,656

UNITED STATES PATENT OFFICE 1,941,656

FRICTION BRAKE

William A. Blume, Detroit, Mich., assignor to American Brakeblok Corporation, New York, N. Y., a corporation of New York Application June 28, 1930. Serial No. 464,635

5 Claims. (Cl. 188—234)

This invention relates to friction brakes and more particularly to that form which embodies a slipper adapted for use with a rotating disk.

The objects of the invention are to provide a novel slipper which may be readily installed in position and replaced whenever desired, and which comprises in unitary form a composition friction body having a reenforce back of grid formation embedded therein.

Selected embodiments of the invention are illustrated in the accompanying drawing and, therein, Fig. 1 is a perspective view illustrating my invention in association with a rotatable disk that is fragmentally shown;

Fig. 2 is a sectional view taken substantially on the line 2—2 of Fig. 1;

Fig. 3 is an elevation of the back of the removable portion;

Fig. 4 is a view similar to Fig. 3 showing the reenforcing member;

Fig. 5 is a sectional view taken substantially on the line 5—5 of Fig. 4; and

Fig. 6 is a fragmental perspective view of a modified form of construction.

Referring to the drawing showing my improved slipper, 6 is the shoe which, in the present instance, embodies a segmental body portion 7 having flanges 8 and 9 along the side edges thereof. At substantially the medial portion on the shoe 6 a bearing 10 is provided and the operating and supporting means are connected in this bearing in a suitable manner. On each side of the bearing 10 on the body 7 are bosses 11 and 12 having openings therein through which bolts 13 and 14 are passed to secure the friction portion of the slipper to the shoe 6, washers 15 and 16 being arranged intermediate the heads of the bolts 13 and 14 and the faces of the bosses 11 and 12.

The friction portion of the slipper comprises a composition friction body in the form of a block indicated by 17 formed of a suitable composition friction material. This composition friction material is pressed, molded, or otherwise joined to a reenforce 18. This reenforce is of segmental shape corresponding to the shape of the shoe 6 and comprises a frame embodying side rails 19 and 20 joined by end rails 21 and 22. Cross bars 23 extend between the side rails 19 and 20 in spaced relation and a connecting bar 24 extends between the medial portion of the cross bars 23. Thus, a metal skeleton back of grid formation is provided. At the juncture of the connecting bar 24 with the outermost of the cross bars 23 bosses 25 and 26 are formed having tapped openings 27 and 28 therein and the bolts 13 and 14 are fitted into these tapped openings to join the block to the shoe. As shown in the drawing the side and end rails and cross and connecting bars define openings in the reenforce, and the edges of these openings are preferably beveled.

Composition friction material is pressed or otherwise forced into the openings and thus the back 18 is embedded in and joined to the composition material 17 to form a block having opposed flat faces. While any suitable metal may be employed for the back 18, I prefer to use brass or other soft material. Therefore, if the friction material 17 is all worn away and the back engages the member to be braked, scoring will be prevented. The flange 8, the bottom rail 20, and the composition material are preferably recessed at the medial portions thereof, as indicated at 29, to provide a clearance.

In the present instance, a disk indicated by 30 is arranged for rotation in a vertical plane, and slippers of the above described character are arranged in opposition on each side of the disk with the blocks faced toward the disk. When these slippers are moved into engagement with the disk and pressure is applied a braking action results to retard rotation of the disk which may be, if desired, the disk of a so-called disk brake.

In Fig. 6 a modified form of construction is shown and herein the shoe 6 is provided with openings substantially similar to those described. However, in this instance a reenforce 31 is substituted for the reenforce 18, this reenforce 31 having studs 32 extending from the portions thereof described as having the openings 27 and 28 provided therein. These studs 32 are extended through the openings in the shoe 6 and retaining devices such as the cotter keys 33 are extended through openings 34 in the ends of the studs 32.

In all other respects this device is similar to that heretofore described.

While I have illustrated and described selected forms of my invention, it is to be understood that these are capable of variation and modification without departing from the purview of my invention as set forth in the following claims:

I claim:

1. A slipper for a friction brake embodying a segmental shoe having a flat face, a composition friction material having a reenforce embedded therein and providing a segmental block complementary to the shoe, and means for detachably connecting said block on said flat face, said reenforce including side and end rails, cross bars extending between said side rails, and a connecting bar extending between said cross bars and terminating in spaced relation with said end rails.

2. A slipper for a friction brake embodying a segmental shoe having a flat face, a composition friction material having a reenforce embedded therein and providing a segmental block complementary to the shoe and having opposed flat faces, and means detachably connecting the block to said shoe with one of the flat faces thereof flatly engaging the flat face of said shoe, said reenforce including side and end rails, cross bars extending between said side rails, and a connecting bar extending between said cross bars and substantially parallel with said side rails and terminating at the cross bars juxtaposed to said end rails.

3. A slipper adapted to be detachably secured to the shoe of a friction brake and including a block of composition friction material providing a flat braking surface on the front face thereof, a reenforce at the back face of said friction material and having bevelled edged openings therein, the larger ends of the openings being positioned at the back of the slipper, portions of said friction material extending into and filling the openings and anchoring said material to said reenforce, and means cooperating with said reenforce and acting in opposition to said bevelled edges for securing said friction material to the shoe.

4. A slipper for a friction brake embodying a shoe having a flat face, a composition friction material, and a reenforce for said material comprising side and end rails, cross bars extending between said side rails and in spaced relation with each other, a connecting bar extending between said cross bars and having bosses at the ends thereof, said connecting bar terminating in the cross bars juxtaposed said end rails, said bosses having openings therein, and means connected in said openings securing said reenforce and material on the flat face of said shoe.

5. A slipper for a friction brake embodying a shoe having a flat face, a composition friction material, and a reenforce for said material comprising side and end rails, cross bars extending between said side rails and in spaced relation with each other, a connecting bar extending between said cross bars and having bosses at the ends thereof, said connecting bar terminating in the cross bars juxtaposed said end rails, studs projecting outwardly from said bosses, said shoe having openings therein through which said studs are extended, and means for preventing displacement of said studs from said openings

WILLIAM A. BLUME.